July 30, 1957 R. L. TIMMS 2,800,988
COIN AND KEY CONTROLLED VENDING APPARATUS
FOR MERCHANDISE AND SERVICES
Filed Sept. 12, 1952 2 Sheets-Sheet 1

INVENTOR
Ross L. Timms
BY
Oldham & Oldham
ATTORNEYS

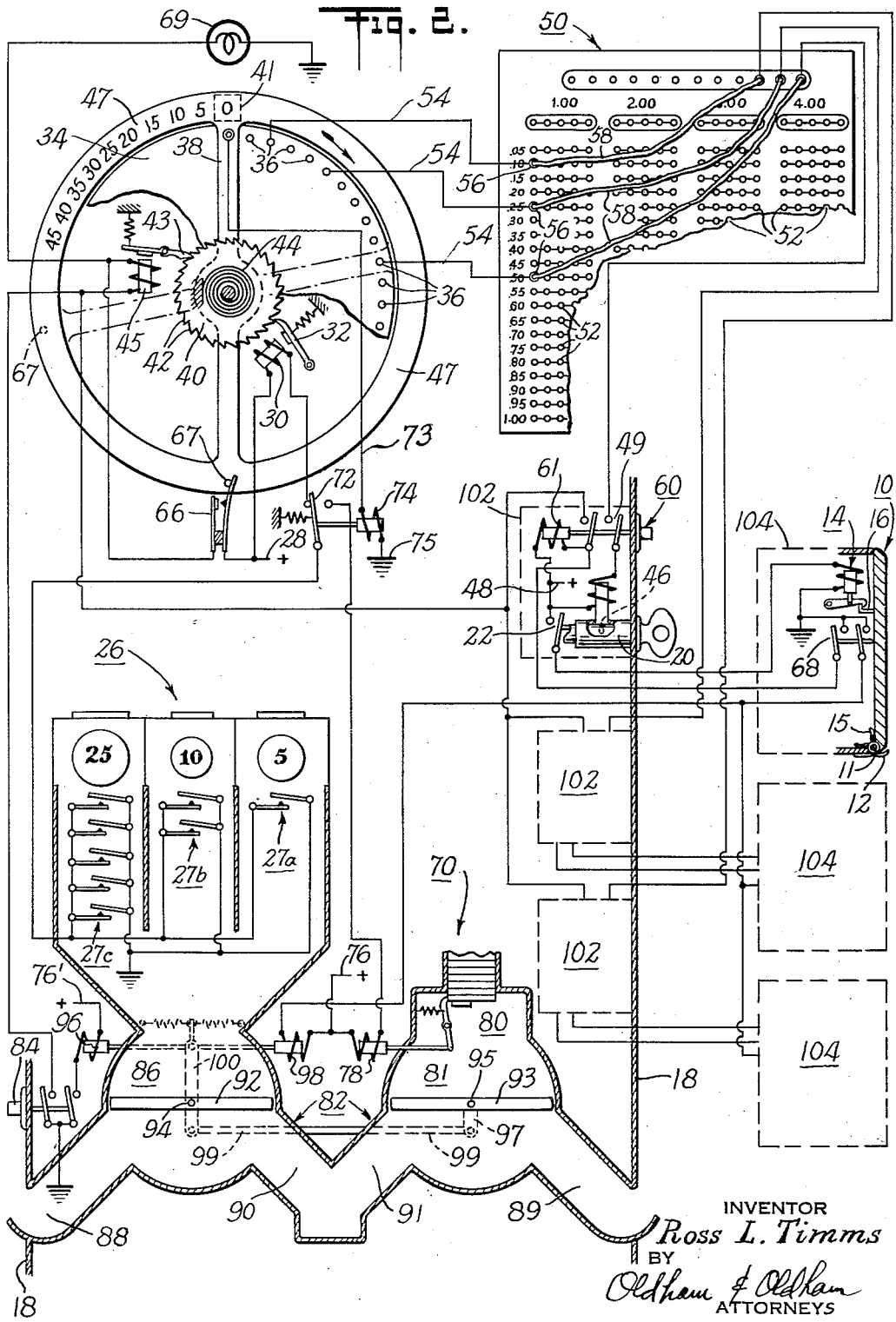

United States Patent Office 2,800,988

Patented July 30, 1957

2,800,988

COIN AND KEY CONTROLLED VENDING APPARATUS FOR MERCHANDISE AND SERVICES

Ross L. Timms, Akron, Ohio

Application September 12, 1952, Serial No. 309,163

7 Claims. (Cl. 194—9)

My invention relates to self-service apparatus, and, more particularly, is concerned with apparatus of this type which is adapted to dispense a plurality of items or services varying over a considerable range in price from a single coin-receiving and collecting station.

The present invention is related to the self-service apparatus described in my U. S. Patent No. 2,557,161. Heretofore, coin-controlled machines for dispensing products to the public have usually been limited to the sale of a single product at a fixed price. In my above-mentioned patent, I described an apparatus wherein an operator is provided at a central control board for controlling the operation of a plurality of remotely positioned stations, such operator being able to sell goods or services of a wide variety of types and price ranges.

Such an apparatus, although a practical vending machine, is subject to the limitations that it is not as flexible as might be desired and that the services of a telephone operator are required at all times.

It is the general object of my present invention to provide an improved automatic self-service apparatus adapted to the sale of services or products of varying costs or qualities which avoids and overcomes the above-listed and other objections to the prior art practices.

It is a further object of my invention to provide in a vending machine a coin-receiving and collecting apparatus which returns in change any amount deposited in excess of the price of the item being purchased.

A further object of my invention is the provision of a locking system for a vending machine by which only the customer having the proper identification can operate the machine to collect his goods on which a service has been performed.

Another object of my invention is to provide vending apparatus which is rendered operative only by the combination of a key and the deposit of a proper sum of money.

The foregoing objects of my invention, and other objects which will become apparent as the description proceeds, are achieved by the provision of a plurality of lockers, or the like, electrically operatable from a central control panel, said control panel having mounted thereon a coin-receiving and registering means adapted to receive, for example, nickels, dimes, and quarters, locker selection means, a coin-return mechanism, and means to indicate the amount of money deposited in the coin register.

It is to be understood that the dispensing means can take a variety of forms and perform a variety of services. In one embodiment of the invention, the dispensing means comprises lockers having electrically actuated locks.

In the accompanying drawings:

Figure 2 is a schematic diagram of the apparatus of Figure 1; and

While the operation of the vending apparatus is, for purposes of simplification, herein shown and described in connection with one locker door, it is to be understood that the vending apparatus to be described normally includes a plurality of such locker assemblies. The exact form of the locker is not essential to the present invention and may take any desired form, or size, depending upon the particular commodity or service being sold.

Figure 1:
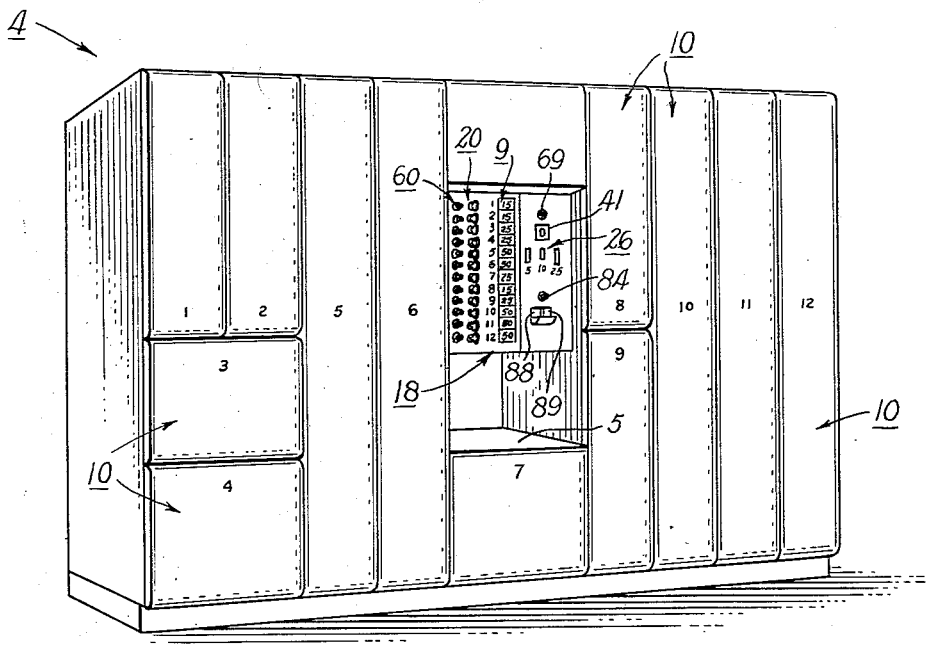
Figure 1 is a perspective view of a locker installation embodying principles of the present invention.

In Figure 1 there is shown a locker group 4 of twelve lockers of varying sizes and shapes, a central control panel 18 and a shelf 5 for temporarily resting packages. The panel 18 has thereon a series of twelve pushbuttons 60, a corresponding series of key locks 20, a similar series of tabs 9 upon which may be indicated the price of the goods or services being dispensed, a light 69, a coin register 26, a coin return button 84 and coin return chutes 88 and 89.

With specific reference to the form of the invention illustrated in Figure 2, the numeral 10 indicates in diagrammatic form a locker door hingedly supported at 11 and urged toward the closed position by spring 12. Secured to the inside of the locker is a solenoid-operated lock mechanism 14 which normally engages the latch 16 to secure the locker door in closed position. When the solenoid lock mechanism is energized, latch 16 is released, allowing the locker door 10 to be opened. A small spring 15 holds the locker door 10 slightly ajar when latch 16 is released. If desired, the spring 15 can be incorporated with the spring 12. The spring 12 swings the door 10 closed when the door is opened wide and released, the momentum of the closing door overcoming the resistance of the spring 15 and the latch 16 re-engaging to secure the locker door once again in locked position.

The solenoid-actuated lock mechanisms of a plurality of locker doors are adapted to be selectively actuated from a central control panel 18, a portion of which is shown at the right in Figure 2, and which is visually and electrically associated with the dispensing lockers. Mounted on the control panel 18 and accessible to any person desiring to use the vending apparatus is a series of key locks 20 (see Fig. 1), the number of such locks corresponding to the number of lockers. Turning the key in the lock closes a single-pole single-throw switch 22 mounted on the back end of the lock which energizes the solenoid-actuated locking means 14 from an electrical power source thereby to allow locker door 10 to spring ajar under the influence of spring 15.

Before a purchaser can unlock the particular locker to which he desires access, it is necessary for him first to deposit the required amount of money as determined by the price of the service or goods to thereby be dispensed. This is accomplished by the unique coin-operated switching mechanism and associated circuit hereinafter described.

Associated with control panel 18 is a coin register 26 (Figure 2) which is adapted to take nickels, dimes, or quarters (and which could be adapted to take pennies and half dollars, as well). The coin register 26, although only shown schematically in Figure 2 includes a slug rejecter of a known type which separates the coins and discharges them through separate slots which have positioned therebelow corresponding groups of switches 27a, 27b and 27c so arranged that a nickel will actuate one switch; a dime, two successive switches; and a quarter, five successive switches, respectively, as they pass to the coin compartment 86. In series with these switches 27 is an electrical power source 28, a solenoid 30, and a normally closed contact 72 of a relay 74. The solenoid 30 is so designed and arranged as to actuate a pawl mechanism 32, which serves as a stepping means for a rotary stepping switch indicated generally at 34. Every electrical pulse through the solenoid 30 actuates the pawl means 32 so as to advance the rotary stepping switch 34 one position. Thus a nickel placed in the coin register 26 transmits one pulse to the switch 34 advancing it one position, a dime transmits two pulses advancing the switch 34 two positions, and a quarter deposited in the coin register 26 transmits five pulses advancing the switch 34 five positions. The switches 27 are spaced or provided with delay circuits such that the pulses transmitted to the solenoid 30 are at sufficiently spaced intervals to allow proper operation of pawl mechanism 32.

Rotary switch 34 includes a plurality of fixed contacts 36 and a rotary contact arm 38 so adapted and arranged as to advance one contact point 36 for each impulse received at the solenoid 30. Rotary contact arm 38 is integrally attached to a disc 40 around the circumference of which the ratchet notches 42 are cut. It will be appreciated that to advance the rotary contact arm 38 one contact point for each impulse of the solenoid 30, there must be the same number of ratchet notches 42 as there are contact points 36.

The pawl means 32 advances the contact arm 38 in opposition to a spiral spring 44 which is so arranged as to urge the rotary arm 38 back to the zero or starting position. A locking pawl 43 holds the contact arm 38 in the position to which it has been advanced by the pawl 32 until the magnet 45 is energized as hereinafter described.

Printed or embossed on the face of a rotary disc 47, which may be made transparent near the rim thereof, are the numerals 0, 5, 10, 15, 20, etc., for example, one numeral for each contact point 36. The disc 47 is adapted to rotate with contact arm 38. The rotary switch 34 is so mounted on the back of the control panel 18 that, with the aid of a light (not shown), these numerals are visible, one at a time, successively, through a window 41 as the rotary switch 34 is advanced by the deposit of coins in the coin register 26. The purchaser is thus given a ready check on the total amount of change deposited in the coin register.

From the foregoing description, it will be understood a rotary stepping switch is provided of the single-pole, multi-throw type having a plurality of contact points corresponding to different values of money in intervals of five cents. Depositing a coin in the coin register advances the switch the proper number of positions and additional coins continue to advance the switch until the rotary arm 38 reaches a contact corresponding in value to the price of the goods or service to be dispensed by the selected locker. When this contact point is reached, the contact arm no longer advances, any money over the price of the goods being returned to the customer in change. The operation of this feature will become clear as the description proceeds.

To prevent turning of the key lock 20 in opening the corresponding locker door 10 until the proper amount of money is deposited, a solenoid-operated detent 46 is provided on the key-operated lock. Until this solenoid detent 46 is energized, the lock cannot be turned to actuate switch 22. The solenoid which operates detent 46 is connected in series with the power source 48, contacts 49 of push button 60, a patch board, indicated generally at 50, the rotary stepping switch 34, arm 38 and the winding of relay 74 to ground at 75. When push button 60 has been actuated to close contacts 49 and the proper amount of money is deposited in the coin register 26 to index the rotary stepping switch 34 around to a contact point 36 corresponding to the price of the goods or services to be dispensed from the selected locker, a circuit is closed through the pre-set patch board 50 to energize the solenoid detent 46 of the selected locker from the power source 48. The purchaser is then able to turn the key lock 20 to open the locker door 10.

The purpose of the patch board 50 is to provide an arrangement whereby the solenoid detents 46 of the various lockers can be quickly and interchangeably connected to the proper contact point 36 in the rotary switch 34 corresponding to the price of the goods or services to be dispensed by the various lockers and the associated key lock. For instance, if the particular key lock 20 operates a locker dispensing a two-dollar article, the associated solenoid detent 46 must be directly connected to the contact point 36 on the rotary switch 34 which is in contact with the rotary arm 38 when exactly two dollars in change has been deposited in the coin register 26.

Patch board 50 includes a plurality of sockets 52 arranged in vertical and horizontal rows. Each contact point 36 on the rotary switch 34 is connected through wires 54 to appropriate sockets 52, each contact point 36 being connected to a group of sockets 52, for example, five, wired in series. The total number of sockets 52 therefore is, in the example shown, five times the number of contact points provided on the switch 34.

A plurality of plugs 56, adapted to be inserted in the sockets 52, are connected through wires 58 to the solenoid detents 46, the number of plugs 56 and associated wires 58 corresponding in number to the number of lockers provided in the vending apparatus. Thus, one wire 58 and one plug 56 are connected to each solenoid detent. If it is desired that a particular locker dispense a fifty cent article, for example as shown in Figure 2, the solenoid detent associated with the lock key operating that locker is connected through its corresponding plug 56 to the proper socket 52 that is electrically connected with a contact point 36 corresponding to the fifty cent position of the rotary switch 34.

For convenience, the sockets 52 are arranged on the patch board 50 so that the proper socket corresponding to the price of the article or services to be dispensed can be easily found and the appropriate plug 56 inserted. It is to be understood that the patch board is not accessible to the purchaser, but only to the operator of the vending machine. The operator pre-sets the vending apparatus by making the proper connection on the patch board so that the lockers can be opened only when the correct money is deposited in the coin register 26.

To this end, the sockets 52 are arranged so that they correspond to prices starting at five cents, with each successive row down the board increasing in steps of five cents to the bottom row of sockets which correspond to one dollar. As mentioned above, the first five sockets horizontally across are connected together. This arrangement is provided so that several lockers, up to five, for example, can be set at the same price; however, any number of sockets may be provided at one price. Extra sockets in groups of, for example, five in series can be connected by a jumper to any group of sockets on the board to provide additional outlets for any one contact on rotary switch 34.

These groups of five sockets are arranged in vertical columns, the first column being from five cents to a dollar, the second column from $1.05 to two dollars, with successive columns provided until the highest price which the rotary switch 34 can handle is reached. Each group of five sockets is directly connected to the corresponding contact point 36 on the rotary switch 34, there being one group of sockets on the board for each contact point on the switch.

In series with each solenoid detent 46 and its corresponding patch board line 58 is the pushbutton switch 60 mounted on the control panel 18, there being one pushbutton for each lock switch. These pushbuttons are of a well-known interlocking type which prevent more than one button being depressed at a time. In addition if desired a solenoid 61, may be provided for each locker which is energized when locker door 10 is opened to automatically reset its associated button that is depressed. Each pushbutton operates a double-pole, single-throw switch which is closed when the button is depressed. In operation, the purchaser selects the locker dispensing the goods or services which he desires to purchase and then presses the corresponding pushbutton 60. This closes the circuit between the rotary stepping switch 34 and the solenoid detent 46 so that when the proper amount of money is deposited in the coin register 26, the key lock switch 22 can be actuated.

Depressing pushbutton 60 also closes a switch in the circuit controlling the actuating magnet 45 for the release mechanism 43 which circuit includes in series the power source 28, a switch 66, the magnet 45, pushbutton switch 60, and a micro-switch 68 associated with the locker door 10. The micro-switch 68 is normally open when the locker door 10 is in locked position.

The switch 66 is operated by the rotary movement of the disc 47. When the disc 47 is in the zero position, the switch 66 is held open by pin 67, but as soon as the ratchet mechanism 32 advances the disc 47, the switch 66 closes. When the disc 40 and the contact arm 38 have advanced to the proper contact position and the locker door 10 is consequently opened, micro-switch 68 closes, completing the circuit to the magnet 45 thereby releasing the magnetically operated release mechanism 43. This allows the disc 40 and associated contact arm 38 to return to the zero position, as urged by spring 44. The purpose of the pushbutton switch 60 in the releasing circuit is to connect the electromagnet 45 with the micro-switch 68 associated with the particular locker door 10 to be opened to thereby effect the resetting of the apparatus for the next customer.

Switch 66 also serves to energize a light 69 mounted on the control panel in direct view of the customer. This light becomes energized with the first coin deposited and continues to stay lit until the purchasing transaction is complete. The purpose of the light is to serve as an indication or warning that the machine is in operation and that there is money tied up pending completion of the transaction.

An additional feature of my vending apparatus is a refund mechanism 70, by means of which any money deposited in coin register 26 that is in excess of the price of the item being purchased is returned in change. The operation of the refund mechanism 70 is controlled by the single pole-double throw contacts 72 of relay 74. The winding of relay 74 is connected by conductor 73 with the contact arm 38, and also with ground 75. Until such time as the stepping switch 34 moves the contact arm 38 to locker-opening position, the switching relay 74 is not energized, in which case the power source 28 is connected in series through the ratchet-operating solenoid 30 by the normally closed contacts 72 of relay 74 to the coin register 26. When the contact arm 38 has advanced to the contact 36 corresponding to the price of the article to be dispensed (locker-opening position), the switching relay 74 becomes energized thereby through contact 49 of push button switch 60, now closed, and patch board 50, contact 36, arm 38 and solenoid 74 to ground, opening the normally closed contacts 72 of relay 74 to break the circuit between the coin register 26 and the ratchet operating solenoid 30, and closing its normally open contacts to connect the coin register 26 with the refund mechanism 70 and the electrical power source 76. Once the switching relay 74 has become energized, any additional pulses put out by the coin register 26 operate the refund mechanism 70 rather than advance the contact arm 38. The relay 78 is of a fast acting type to ensure operation thereof between the pulses from the coin register 26 which are also spaced at approximate intervals as described above.

Each pulse received by the refund mechanism 70 operates the solenoid 78, which in turn operates to eject one nickel through coin discharge chute 80 into receiving compartment 81 in a coin return mechanism indicated generally at 82. Thus, if a fifty-five-cent article, for example, is being purchased and three quarters are dropped into the coin register 26, contact arm 38 advances to the contact position 36 corresponding to fifty-five cents, at which time the switching relay 74 is energized by closing of contact 36 with arm 38. The four additional pulses generated by the coin register 26 after closing of arm 38 with contact 36 will eject four nickels in the refund mechanism 70, returning twenty cents in nickels to the coin receiving compartment 81.

So that the switching relay 74 will be energized a sufficient length of time to allow the refund mechanism 70 to function after the locker door 10 is released and micro-switch 68 closed, a delaying action is provided in the release mechanism 43. This may be by the well-known expedient of putting a copper ring around the pole piece of magnet 45 to retard the building up of the magnetic flux or any other such expedient.

The coin return mechanism 82 also serves to hold the money deposited in coin register 26 and ejected from refund mechanism 70 until any of the locker doors 10 actually open. Any time before micro-switch 68 is released by the opening of locker door 10, the purchaser may recover the money he has deposited by pushing the coin return switch 84. This will also deposit in the coin box any change in compartment 81.

The coin return mechanism consists essentially of two separate receiving compartments 81 and 86, the receiving compartment 86 communicating with a coin refund chute 88 opening at the front panel and a collection chute 90 within the cabinet. Situated within the compartment 86 is a pivotally mounted trap 92, pivoted on the central axis 94. The trap is rotated by a pair of solenoids 96 and 98 connected to the axle 94 by crank arm 100. Energizing "refund" solenoid 96 tilts the trap 92 to the left, depositing the money held in compartment 86 in the coin return chute 88. Energizing "collect" solenoid 98 tilts the trap 92 to the right, depositing the money in the collection chute 90.

Receiving compartment 81 communicates with a coin return chute 89 and a collection chute 91. Situated within the compartment 81 is a pivotally mounted trap 93, pivoted on the central axis 95. The trap is rotated to deposit the money held in compartment 81 into either chute. The trap has a crank arm 97 connected by means of link 99 to crank arm 100 so that when "refund" solenoid 96 is energized, the trap 93 tilts to the left, depositing money held in compartment 81 in the collection chute 91. Energizing solenoid 98 tilts the trap 93 to the right, depositing money held in compartment 81 in the coin return chute 89, from which the customer is able to recover his change.

The "collect" solenoid 98 is electrically connected in series with the power source 76 and the parallel-connected micro-switches 68. Each of the micro-switches 68 is of the single-throw, double-pole type, with solenoid 98 connected to a pole which is "open" when the associated locker door 10 is closed and "closed" to actuate solenoid 98 when the locker door opens. The "refund" solenoid 96 is connected in series with power source 76' and coin return switch 84. So that the rotary switch 34 will return to "zero" when the money is refunded, switch 84 is arranged to close the circuit through release magnet 45. Thus the "refund" solenoid 96 can be energized any time before the locker door 10 is opened by actuating switch 84. As soon as the locker door 10 opens, the "collect" solenoid 98 will automatically deposit the money in the "collect" chute.

The coin return mechanism acts as a safeguard against loss by either the operator or the customer. In the event anything happens in the operation of the machine short of complete power failure, such as sticking of the locker door or failure to unlatch, a change of mind or misstep by the customer, by means of the coin return switch the customer can get his money back. However, as soon as the locker door opens, his money is collected and any change he has coming as a result of overpayment is released to him.

Even though it is believed the operation of the apparatus will be apparent from the foregoing description, a brief review thereof will now be made for purposes of summary and simplification. The form of the invention described above is particularly adapted to be used where the customer brings in an article on which he desires some service to be performed, for example, dry cleaning, laundry, tailoring, electric appliance, repair, shoe repair work, or the like. The customer, in this instance, can go to the central control panel 18 and select a locker which is empty. The empty lockers are easily identified by the customer because the key is in the key lock. To remove the key and open the empty locker, the customer first pushes the corresponding pushbutton 60 and then deposits one dime in the coin register 26. Prior to this time, the operator has connected all the plugs 56 associated with empty lockers in the ten-cent bracket. When the customer drops the dime into the coin register 26, two pulses are sent through the solenoid 30 which, by means of the ratchet mechanism 32 advances the rotary contact arm 38 to the "10 cent" contact position.

The circuit is then closed, energizing the solenoid detent 46, which permits the customer to turn the key in the key lock 20 and remove it, and at the same time actuate the switch 22 to open the locker door 10. When the locker door 10 opens, micro-switch 68 is closed, which in turn completes the circuit to relay 45 and releases the pawl 43 so that contact arm 38 can return to zero. The customer can put any article in the locker along with a note describing the work he desires to be done on the article and close the locker door. A pad of paper and a pencil may be secured to the inside of the locker door for the purpose of writing a note, if desired.

To retrieve the article at a later date, the customer inserts the key in the appropriate lock (the keys and locks bearing identifying numbers), pushes the associated pushbutton, and deposits money equal to or in excess of the price indicated by the operator of the apparatus on a tab 9 alongside the pushbutton. Prior to this, the operator has serviced the article, returned it to the locker, inserted the plug 56 on the patch board 50 that is associated with that particular locker in the socket 52 corresponding to the price of the service performed on the customer's article (less the customer's ten-cent deposit), and then indicated the price on the aforementioned tab near the appropriate pushbutton on the front of the panel 18.

The customer, having pushed the button 60 and deposited his money, then turns the key in the key lock 20 and opens the locker to secure his property. Any excess deposited in the coin register 26 is returned in nickel change by the refund mechanism 70 as described above.

Figure 3:
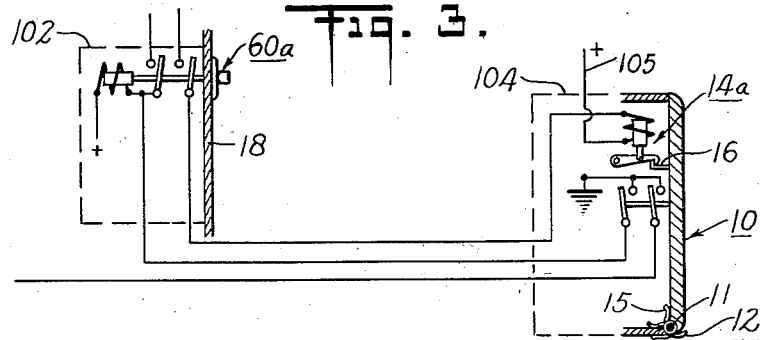
Figure 3 is a schematic diagram of another form of apparatus embodying principles of the invention.

A modification of my invention is illustrated in Figure 3, it being understood that the mechanism of Figure 3 is to be substituted for that in one pair of the dotted line boxes 102 and 104 of Figure 2, the box 102 being located at the control panel 18 and box 104 at the locker door. In this form, no key lock 20 is used. The solenoid locking mechanism 14a is connected directly in series with a pushbutton 60a and by way of the patch board, line 54, arm 38 line 73 and solenoid 74 to ground, the opposite end of the solenoid of mechanism 14a being connected to a positive source 105 as shown in Fig. 3, so that when the pushbutton switch 60a is closed and the proper amount of money deposited in the coin register 26, the solenoid 14a is energized and the locker door opened. This form of the invention is adapted to be used where the apparatus is serving merely as a dispensing means. The lockers are arranged by means of patch board 50 to dispense a number of articles of different prices, or even the same price. The customer selects the item he wishes to purchase, pushes the corresponding pushbutton 60a, deposits the correct amount of money in the coin register 26 and the item is automatically dispensed.

From the foregoing, it will be recognized that the various objects of my invention have been achieved by the provision of an automatic self-service apparatus for vending a variety of services or commodities. Apparatus of this type adapts itself to a wide variety of uses and installations. Solely by way of illustration, and in no way limiting the uses of my improved equipment, the apparatus of my invention may be used as a self-contained unit to vend automatically conventional items from a delicatessen store, grocery, meat market, drug store, or the like, during or after regular business hours, and all without the attention of an operator except for periodic servicing.

Accordingly, it is to be particularly understood that my invention is not to be limited to the particular embodiments thereof illustrated or described.

I claim:

1. An automatic vending machine comprising a plurality of lockers having doors, a solenoid-operated latch releasably securing each door in closed position, a key-operated lock switch for electrically connecting each solenoid latch to an electrical power source, a solenoid detent operatively associated with each lock switch, a manual selector switch for electrically connecting each solenoid detent to the electrical power source, a stepping switch having electrically actuated stepping and release mechanisms, a plurality of contacts on said stepping switch, a manually operated patchboard having a plurality of jacks and plugs, the jacks being electrically connected in series with the stepping switch contacts and with one of the manual selector switches, a switching relay having a winding electrically connected in series with the stepping switch and the return side of the power source, a coin register for receiving and identifying coins, said coin register being normally electrically connected in series with the electrical stepping mechanism and the power source whereby said coin register controls the advance of the stepping switch in response to the number and value of coins deposited therein, an electrically actuated refund mechanism for returning money in the amount of overpayment, said refund mechanism being switched in series with the coin register by the switching relay when the relay is energized, and a switch operatively associated with each locker door and electrically connected in series with the stepping switch release mechanism and adapted to energize the release mechanism when the locker door opens.

2. An automatic vending machine comprising a plurality of lockers having doors, a solenoid-operated latch releasably securing each door in closed position, a manually controlled switch means for electrically connecting each solenoid latch to an electrical power source, a stepping switch having electrically actuated stepping and release mechanisms, a plurality of contacts on said stepping switch, a manually operated patchboard having a plurality of jacks and plugs, the jacks being electrically connected in series with the stepping switch contacts and with said manually controlled switch means, a switching relay having a winding electrically connected in series with the stepping switch and the return side of the power source, a coin register for receiving and identifying coins, said coin register being normally electrically connected in series with the electrical stepping mechanism and the power source whereby said coin register controls the advance of the stepping switch in response to the number and value of coins deposited therein, an electrically actuated refund mechanism for returning money in the amount of overpayment, said refund mechanism being switched in series with the coin register by the energization of the switching relay, and a switch operatively associated with each locker door and electrically connected in series with the stepping switch release mechanism and adapted to energize the release mechanism when the locker door opens.

3. An automatic vending machine comprising a plurality of lockers having doors, a solenoid-operated latch releasably securing each door in closed position, a key-operated lock switch for electrically connecting each solenoid latch to an electrical power source, a solenoid detent operatively associated with each lock switch, a manual selector switch electrically connecting each solenoid detent to the electrical power source, a stepping switch having electrically actuated stepping and release mechanisms, a plurality of contacts on said stepping switch, a manually operated patchboard having a plurality of jacks and plugs, the jacks being electrically connected in series with the stepping switch contacts and with one of the manual selector switches, a coin register for receiving and identifying coins, said coin register being electrically connected in series with the electrical stepping mechanism and the power source whereby said coin register controls the advance of the stepping switch in response to the number and value of coins deposited therein, and a switch operatively associated with each locker door and electrically connected in series with the stepping switch release mechanism and adapted to energize the release mechanism when the locker door opens.

4. An automatic vending machine comprising a plurality of lockers having doors, a solenoid-operated latch releasably securing each door in closed position, a manually operated selector switch for electrically connecting each solenoid latch to an electrical power source, a stepping switch having electrically actuated stepping and release mechanisms, a plurality of contacts on said stepping switch, a manually operated patchboard having a plurality of jacks and plugs, the jacks being electrically connected in series with the stepping switch contacts selectively by patch board connections, a coin register for receiving and identifying coins, said coin register being electrically connected in series with the electrical stepping mechanism and the power source whereby said coin register controls the advance of the stepping switch in response to the number and value of coins deposited therein, and a switch operatively associated with each locker door electrically connected in series with the stepping switch release mechanism and adapted to energize the release mechanism when the locker door opens.

5. An automatic vending machine comprising a plurality of lockers having doors, a solenoid-operated latch releasably securing each door in closed position, a key-operated lock switch for electrically connecting each solenoid latch to an electrical power source a key releasably positioned in said lock for actuation thereof, a solenoid detent operatively associated with each lock switch, a manual selector switch electrically connecting each solenoid detent to the electrical power source, a single pole stepping switch having electrically actuated stepping and release mechanisms, a plurality of contacts on said stepping switch, a manually operated patchboard having a plurality of jacks and plugs, the jacks being electrically connected in series with the stepping switch contacts and with one of the manual selector switches, and a coin register for receiving and identifying coins, said coin register being electrically connected in series with the electrical stepping mechanism and the power source whereby said coin register controls the advance of the stepping switch in response to the number and value of coins deposited therein said solenoid detent for holding said key operated switch and said manual selector switch being connected in series with said stepping switch through said patch board whereby said key may be turned to open said locker doors upon proper positioning of all said elements and removed and retained by the customer as an identifying check.

6. An automatic vending apparatus for vending a plurality of goods or services of varying costs comprising a plurality of electrically actuated dispensing means, each dispensing means being secured in locked position by a solenoid controlled latch and also by a key operated lock, said key operated lock being normally held in locked position by a solenoid operated detent having its solenoid in series with a normally open push button switch at said dispensing means a stepping switch having electrically actuated stepping and release mechanisms, a plurality of contacts on said stepping switch, a manually operated patchboard having a plurality of jacks and plugs, the jacks being electrically connected selectively in series with the stepping switch contacts and with said push button switch and the solenoid of said detent so that the solenoid of the detent is energized when the stepping switch has advanced a desired amount and closed and the push button switch is closed, a switching relay having a winding electrically connected in series with the stepping switch and the return side of a power source, a coin register for receiving and identifying coins, said coin register being normally electrically connected in series with the electrical stepping mechanism and the power source through said switching relay whereby said coin register controls the advance of the stepping switch in response to the number and value of coins deposited therein, an electrically actuated refund mechanism for returning money in the amount of overpayment, said switching relay being arranged to connected said refund mechanism in series with said coin register when the amount of money deposited reaches the amount for which said patch board has been set up whereby any additional money deposited actuates said refund mechanism to refund the balance, when said stepping switch is advanced to a predetermined amount and the solenoid of the detent locking said key operated switch being electrically in series with said additional switch said patch board and said stepping switch so as to be energized when said stepping switch has been advanced to such predetermined amount.

7. An automatic vending apparatus of the type described including in combination a coin register adapted to receive at least nickels, dimes, and quarters, an impulse-actuated switch responsive to said coin register, a plurality of contacts on said impulse-actuated switch, a contact arm on said impulse actuated switch adapted to successively engage said contacts, a plurality of electrically operated dispensing means, a lock operatively associated with each of said dispensing means, an electrically operated release for each lock, a manually operable normally open push button switch in series with said electrically operated release, and means for electrically connecting said switch selectively to any one of said plurality of contacts on said impulse-actuated switch.

References Cited in the file of this patent

UNITED STATES PATENTS

| | | |
|---|---|---|
| 1,435,440 | Zsoldos | Nov. 14, 1922 |
| 1,781,423 | Wood | Nov. 11, 1930 |
| 2,000,804 | Wehren | May 7, 1935 |
| 2,354,896 | Weiler | Aug. 1, 1944 |
| 2,475,220 | Chaulk | July 5, 1949 |
| 2,554,048 | Morrison | May 22, 1951 |
| 2,593,102 | Caruso | Apr. 15, 1952 |
| 2,615,545 | Dolman | Oct. 28, 1952 |
| 2,649,947 | Nelsen | Aug. 25, 1953 |